May 18, 1926. 1,585,186
C. C. CRISPEN
LUBRICANT DISTRIBUTOR
Filed June 24, 1924    2 Sheets-Sheet 1
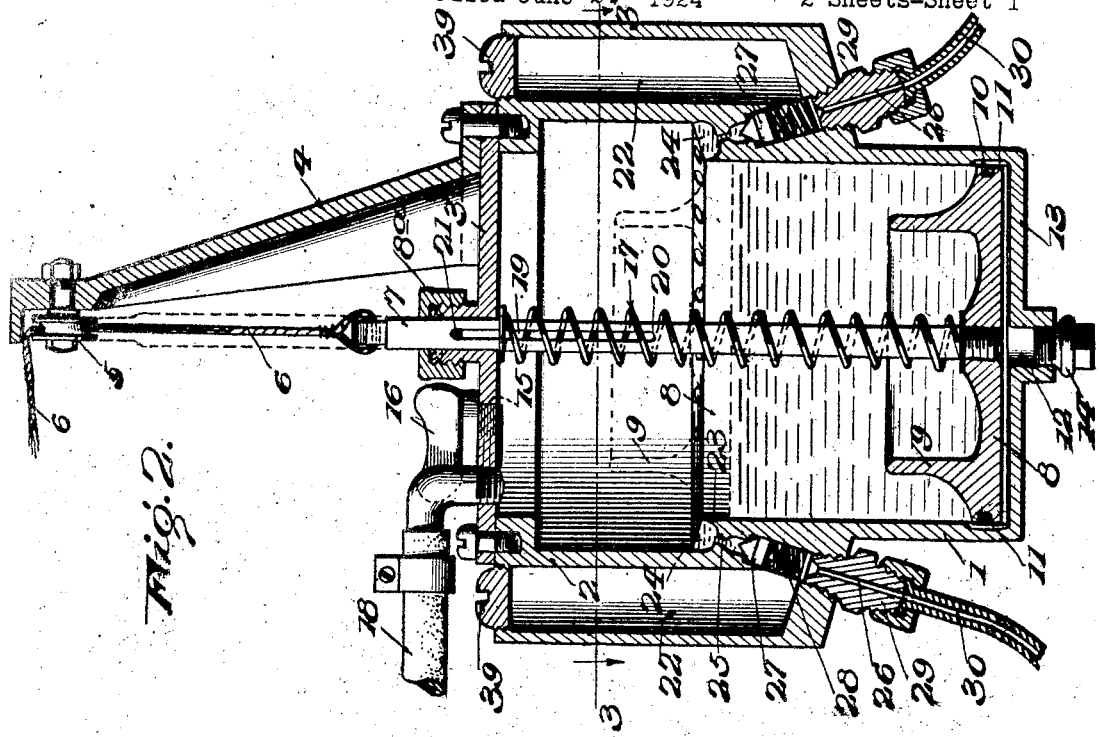
WITNESSES
INVENTOR
C. C. Crispen
BY
ATTORNEYS May 18, 1926.
C. C. CRISPEN
LUBRICANT DISTRIBUTOR
Filed June 24, 1924     2 Sheets-Sheet 2
1,585,186
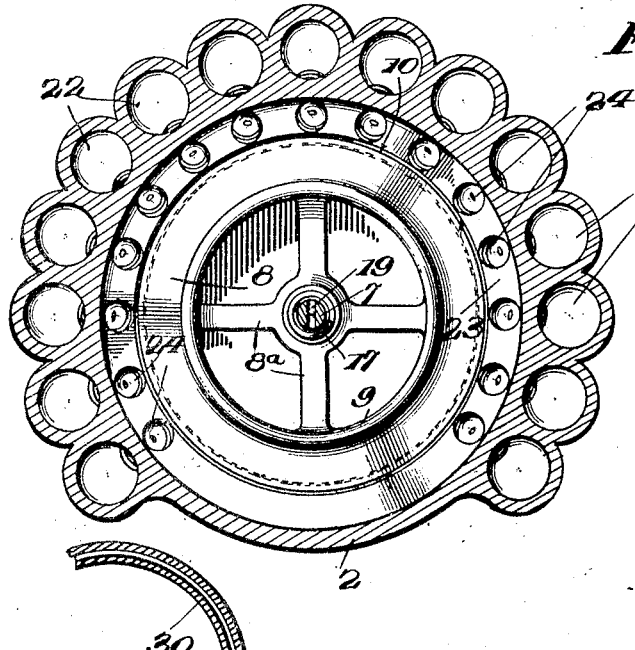
*Fig. 3.*
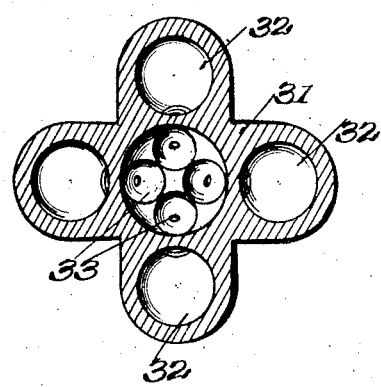
*Fig. 4.*
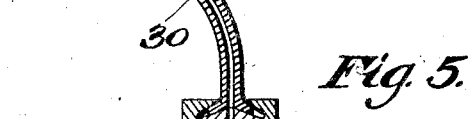
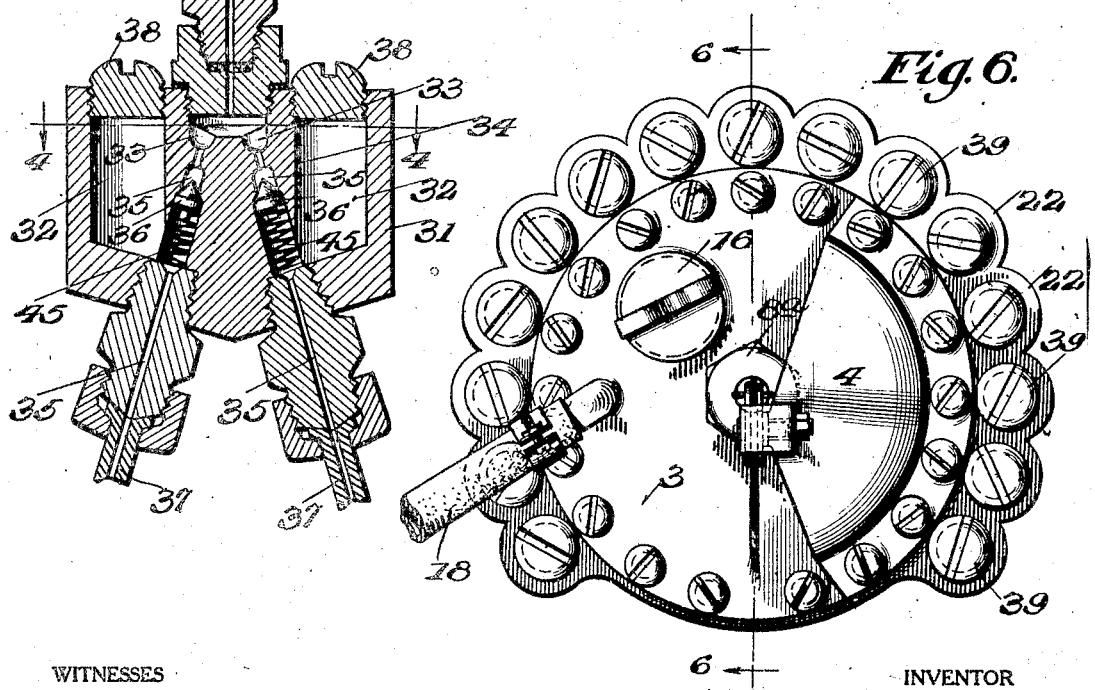
*Fig. 5.*     *Fig. 6.*
WITNESSES
W. A. Williams
INVENTOR
C. C. Crispen
BY
Munn & Co.
ATTORNEYS

Patented May 18, 1926.

1,585,186

UNITED STATES PATENT OFFICE.

CLARENCE CULLEN CRISPEN, OF HARRISBURG, PENNSYLVANIA.

LUBRICANT DISTRIBUTOR.

Application filed June 24, 1924. Serial No. 722,169.

This invention relates to an oil distributor for the numerous bearings of the chassis of a vehicle and has for its object the provision of a device which may be operated from the driver's seat and whereby all the bearings of the chassis may be lubricated simultaneously with quantities of lubricant proportionate to the individual needs of each bearing.
A further object of the invention is the provision of a device for distributing lubricant to the numerous bearings of the chassis of a vehicle whenever desired by a control from the driver's seat so that it will be unnecessary for the operator of the car to give individual attention to each bearing.
This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.
In the drawings:
Figure 1 is a view in perspective of the distributor constructed according to the principles of my invention.
Figure 2 is a vertical elevation of the distributor.
Figure 3 is a horizontal section taken along the line 3—3 of Figure 2.
Figure 4 is a horizontal section of an auxiliary distributor shown in Figure 5.
Figure 5 is a vertical section of an auxiliary distributor used in connection with the main distributor.
Figure 6 is a plan view of the distributor shown in Figure 1.
Referring more particularly to the drawings, 1 designates a cylinder having an air chamber 2 above said cylinder and of larger diameter than the cylinder. A closure 3 is secured to the top of the air chamber and carries a vertically disposed bracket 4 provided with a pulley 5 over which is entrained a cable 6.
One end of said cable is carried to a point adjacent to the driver's seat while the other end is secured to a piston rod 7 movable in a stuffing box 8 formed in the cover 3.
The lower end of the rod 7 is secured to the central portion of piston 8 movable in the cylinder 1. The piston has an integrally formed upstanding circular flange 9 which forms with the inner wall of the cylinder an annular cup for elevating the oil in said cylinder. A piston ring 10 is mounted in a groove in the piston to provide a snug fit for said piston in its cylinder.
An annular groove 11 is formed in the wall of the cylinder at its lower end and is of such height to project slightly above the upper peripheral edge of said piston to permit oil to pass from beneath the piston when said piston is at its lowest position in the cylinder.
A drain opening 12 is provided in the bottom 13 of the cylinder and is closed by a plug 14. An opening 15 is formed in the closure 3 for the admission of oil to the cylinder and a plug 16 closes said opening.
A spring 17 surrounding the rod 7 engages at its lower end the piston 8 while the upper end is seated against the inner face of the closure 3 and resists the upward movement of said piston when the cable 6 is operated.
An air pipe 18 opens into the air chamber 2 through the closure 3. A passage 19 is provided centrally of the rod 7 and has an opening 20 leading to the air chamber 2 and an opening 21 adapted to be placed in communication with the atmosphere when rod 7 is raised sufficiently.
A series of air chambers 22 form part of the exterior portion of the casting of the air chamber 2. Where the cylinder 1 joins the wall of the air chamber 2 an annular shoulder 23 is formed and provided with a series of oil pockets 24, a pocket being furnished for each air cylinder 22. A channel 25 connects each pocket with a passage 26 which is controlled by a valve 27. A spring 28 maintains the valve closed upon its seat. At this point in the channel where spring 28 is located and where the channel 25 is enlarged an opening is provided for placing the air chambers 22 in communication with the passages 26 and the main air chamber 2.
The passages 26 are not only formed with the plugs 29 but are continued through pipe lines 30. In order to limit the number of pipes 30 extending from the main distributor I provide an auxiliary distributor 31 having air chambers 32 in communication with oil pockets 33 formed in the upper end of the central portion 34 of the casting or distributor 31. A channel 35 connects each pocket with an air chamber. A spring pressed valve 36 in an enlargement of each channel controls the flow of air to the air chambers 32 and the oil through the passages to the conduits 37 which are directed to the various bearings of the chassis of the vehicle.

Plugs 38 threaded into the air chambers 32 and plugs 39 threaded into the air chambers 22 are adapted to limit or increase the capacity of said chambers.

The air pipe 18 is connected with any suitable source of air under pressure.

The operation of the device is as follows: The plug 16 is removed and lubricating oil is supplied through the opening 15 to the cylinder 1 and on piston 8. Air at a predetermined pressure is supplied to the pipe 18 whenever desired and especially at the time when it is intended that the various bearings of the chassis are to be lubricated. The cable 6 is acted upon and piston 8 is elevated against the tension of the spring 17 whereby lubricating oil is raised and caused to fill the various pockets 24 at the shoulder 23. It must be borne in mind that when the piston 8 is raised sufficiently the opening 21 is placed in communication with the atmosphere so that the air in chamber 2 is permitted to escape. As soon as the piston 8 is lowered and the passage 19 is closed to the atmosphere and sufficient air under pressure is admitted to chamber 2, the air will act upon the oil in the pockets 24 and upon the valves 27, opening the same, and causing the air to completely fill chambers 22.

Oil is forced down through the passage 26 and into the conduits 30 whence it is carried to bearings to be oiled direct and to the pockets 32 in the auxiliary distributing device 31 which is shown in Figure 5. Air pressure operated in advance of the oil will act upon the valves 36 and cause the same to open with the air filling the chambers 32. Continued pressure upon the valves will cause the oil to be discharged past said valves and into the conduits 35 and the air in the chambers 32 will act on said oil and cause the same to be distributed through the conduits 37 to the various bearings of the automobile.

Since all the bearings do not need the same quantity of lubricating oil the pockets 24 and 33 may vary in capacity and the springs 45 and 28 in the distributors may be varied in strength so that where certain bearings do not always need a predetermined quantity of oil these springs may be made sufficiently strong to resist a predetermined air pressure and therefore prevent excessive lubrication of certain parts. When it is desired, therefore, to lubricate such parts the air pressure may be increased for effectually forcing oil to such bearings. It will be appreciated that the size of the bore of the feed line to certain bearings may also be sufficiently restricted to prevent excessive lubrication of certain bearings which do not require as much lubricating oil as others.

When the spring 17 returns the piston 8 to its lower inoperative position in the cylinder 1 the groove 11 permits the oil which is in the space around the center of the piston between the spokes, to flow under the outer rim of the piston into the space between the flange 9 and the cylinder wall when the oil is too low to flow over said flange.

The web 8ª connects the piston 8 to the rod 7 to permit the oil in the container to pass freely through the piston when the piston is lowered or elevated so that the piston is not retarded by suction or compression.

What I claim is:

1. A lubricant distributor for the bearings in the chassis of a vehicle comprising a cylinder provided with lubricating oil, a plurality of oil pockets formed upon the interior wall of the cylinder, a piston in the cylinder for elevating the oil for filling the oil pockets, and conduits connected with the oil pockets and directed to the various bearings of the chassis for conducting oil from the pockets to said bearings, and means for connecting a source of compressed air with the conduits for forcing the oil through said conduits.

2. A lubricant distributor for the bearings in the chassis of a vehicle comprising a cylinder provided with lubricating oil, a plurality of oil pockets formed upon the interior wall of the cylinder, a piston in the cylinder for elevating the oil for filling the oil pockets, conduits connected with the oil pockets and directed to the various bearings of the chassis for conducting oil from the pockets to said bearings, and an air chamber above the cylinder and in communication with the same and connected with a source of air under pressure, said air under pressure being adapted to force the oil through the pockets and through the conduits.

3. A lubricant distributor for the bearings in the chassis of a vehicle comprising a cylinder provided with lubricating oil, a plurality of oil pockets formed upon the interior wall of the cylinder, a piston in the cylinder for elevating the oil for filling the oil pockets, conduits connected with the oil pockets and directed to the various bearings of the chassis for conducting oil from the pockets to said bearings, an air chamber above the cylinder and in communication with the same and connected with a source of air under pressure, said air under pressure being adapted to force the oil through the pockets and through the conduits, and a plurality of air chambers connected with the cylinder, with an auxiliary air chamber in open communication with the conduits.

4. A lubricant distributor for the bearings in the chassis of a vehicle comprising a cylinder provided with lubricating oil, a plurality of oil pockets formed upon the interior wall of the cylinder, a piston in the cylinder for elevating the oil for filling the oil pockets, conduits connected with the oil pockets and directed to the various bearings of the chassis for conducting oil from the pockets to said bearings, an air chamber above the cylinder and in communication with the same and connected with a source of air under pressure, said air under pressure being adapted to force the oil through the pockets and through the conduits, and a plurality of air chambers connected with the cylinder, with an auxiliary air chamber in open communication with the conduits, and a valve controlling the flow of oil from the oil pockets to the conduits and adapted to be operated to open position by the air pressure.

5. A lubricant distributor for the bearings in the chassis of a vehicle comprising a cylinder provided with lubricating oil, a plurality of oil pockets formed upon the interior wall of the cylinder, a piston in the cylinder for elevating the oil for filling the oil pockets, conduits connected with the oil pockets and directed to the various bearings of the chassis for conducting oil from the pockets to said bearings, an air chamber above the cylinder and in communication with the same and connected with a source of air under pressure, said air under pressure being adapted to force the oil through the pockets and through the conduits, a plurality of air chambers connected with the cylinder, with an auxiliary air chamber in open communication with the conduits, and a piston rod connected with the piston and provided with a central passage, said rod being movable through the top of the air chamber whereby the upper end of the passage is placed in communication with the atmosphere for releasing air pressure in the air chamber.

6. A lubricant distributor for the bearings in the chassis of a vehicle comprising a cylinder provided with lubricating oil, a plurality of oil pockets formed upon the interior wall of the cylinder, a piston in the cylinder for elevating the oil for filling the oil pockets, conduits connected with the oil pockets and directed to the various bearings of the chassis, for conducting oil from the pockets to said bearings, an air chamber above the cylinder and in communication with the same and connected with a source of air under pressure, said air under pressure being adapted to force the oil through the pockets and through the conduits, a plurality of air chambers connected with the cylinder, with an auxiliary air chamber in open communication with the conduits, and means movable with the piston for placing the air chamber in open communication with the atmosphere for relieving pressure when the piston is elevated in the cylinder.

7. A lubricant distributor for the bearings in the chassis of a vehicle comprising a cylinder provided with lubricating oil, a plurality of oil pockets formed upon the interior wall of the cylinder, a piston in the cylinder for elevating the oil for filling the oil pockets, conduits connected with the oil pockets and directed to the various bearings of the chassis for conducting oil from the pockets to said bearings, and means for connecting the pipes with a source of air under pressure so that the oil will be forced through said conduits an auxiliary distributor located in the said conduits and provided with oil pockets to receive oil from said conduits, and auxiliary air chambers adjacent said pockets for supplying air pressure to the oil from said pockets, and conduits connected with the air chambers and the pockets and directed to various bearings of the vehicle.

8. A lubricant distributor for the bearings in the chassis of a vehicle comprising a cylinder provided with lubricating oil, a plurality of oil pockets formed upon the interior wall of the cylinder, a piston in the cylinder for elevating the oil for filling the oil pockets, and conduits connected with the oil pockets and directed to the various bearings of the chassis for conducting oil from the pockets to said bearings, said piston being provided with an upstanding flange and forming with the walls of the cylinder a cup for carrying oil upwardly when the piston is elevated and means for connecting the pipes with a source of air under pressure so that the oil will be forced through said conduits.

9. A lubricant distributor for the bearings in the chassis of a vehicle comprising a cylinder provided with lubricating oil, a plurality of oil pockets formed upon the interior wall of the cylinder, a piston in cylinder for elevating the oil for filling the oil pockets, and conduits connected with the oil pockets and directed to the various bearings of the chassis for conducting oil from the pockets to said bearings, said operating means for the pistons being directed to a point adjacent the driver's seat of the vehicle, and means for returning the piston to its normal inoperative position and means for connecting the pipes with a source of air under pressure so that the oil will be forced through said conduits.

CLARENCE CULLEN CRISPEN.